US007062466B2

(12) United States Patent
Wagner et al.

(10) Patent No.: US 7,062,466 B2
(45) Date of Patent: Jun. 13, 2006

(54) METHOD AND SYSTEM FOR OPERATING ONLINE CLASSIFIED ADVERTISEMENTS

(75) Inventors: Lisa M. Wagner, Grand Prairie, TX (US); Christopher J. Feola, Grapevine, TX (US); James C. Jennings, IV, Dallas, TX (US)

(73) Assignee: The Belo Company, Wilmington, DE (US)

( * ) Notice: Subject to any disclaimer, the term of this patent is extended or adjusted under 35 U.S.C. 154(b) by 716 days.

(21) Appl. No.: 10/006,765

(22) Filed: Dec. 6, 2001

(65) Prior Publication Data

US 2002/0073034 A1 Jun. 13, 2002

Related U.S. Application Data

(60) Provisional application No. 60/251,704, filed on Dec. 6, 2000.

(51) Int. Cl.
*G06F 17/60* (2006.01)

(52) U.S. Cl. ............................ 705/51; 705/1; 705/10; 705/14; 705/26; 705/27; 709/217; 709/218; 709/219; 709/224; 348/460; 348/473

(58) Field of Classification Search ............... 705/51, 705/14, 26, 1, 10, 27; 709/217, 219, 224, 709/203, 218; 348/460, 473
See application file for complete search history.

(56) References Cited

U.S. PATENT DOCUMENTS

| 5,732,216 | A | | 3/1998 | Logan et al. |
| 5,819,092 | A | * | 10/1998 | Ferguson et al. ........... 717/113 |
| 5,999,965 | A | | 12/1999 | Kelly |
| 6,173,322 | B1 | | 1/2001 | Hu |
| 6,336,139 | B1 | | 1/2002 | Feridun et al. |
| 6,801,936 | B1 | | 10/2004 | Diwan |

FOREIGN PATENT DOCUMENTS

| KR | 2001000777 A | * | 10/2000 |
| WO | WO 2000/03332 A1 | * | 1/2000 |

OTHER PUBLICATIONS

Tribute, Andrew et al. NEXPO '96 Jul. 29, 1996 Seybold Report on Publishing Systems v25, n21 retrieved on DIALOG 28 Dec. 2005.*

* cited by examiner

*Primary Examiner*—James A Reagan
(74) *Attorney, Agent, or Firm*—Jenkens & Gilchrist, PC

(57) ABSTRACT

A system and method for pricing a classified advertisement. The method includes receiving a classified advertisement from an advertiser to be distributed to at least one of multiple device types. The classified advertisement may be substantially simultaneously formatted for at least two of the device types. The classified advertisement may be displayed as formatted for presentation by the device type(s). A price may be determined and displayed for the classified advertisement as formatted for presentation by the device type(s).

26 Claims, 11 Drawing Sheets

ONLINE CLASSIFIED ADVERTISMENT SYSTEM-ORDER ENTRY

ADVERTISER INFORMATION
- ADVERTISER NAME: LAURA SMITH
- ADVERTISER ADDRESS: 1 MAIN ST. HOMETOWN, TX
- ADVERTISER PHONE: 214-555-1234

PAYMENT INFORMATION:
- PAYMENT TYPE: ● VISA
  - ○ MC
  - ○ CHECK
- CC # 1234567890
- EXP. DATE 03-14-01

ADVERTISEMENT CLASSIFICATION
- ● AUTOMOBILE
- ○ BOATS
- ○ BUSINESS
- ○ EDUCATION
- ○ EMPLYOMENT
- ○ LEGAL NOTICES
- ○ OBITUARIES
- ○ PETS & LIVESTOCK
- ○ REAL ESTATE
- ○ RENTAL
- ○ SHOPS/SERVICES
- ○ TICKETS

MUSTANG(294)
NISSAN-DATSUN(503)
OLDSMOBILE(168)
PARTS ACCESSORIES(63)
PICKUPS CHEV/GMC(664)

ADVERTISEMENT PERIOD
- START DATE: 12-06-00
- END DATE: 12-09-00

ADDITIONAL COMMENTS OR INSTRUCTIONS:

ENTER DESIRED AD TEXT:

1966 Olds Delta 88: Less than 2000 mi on reblt 455. T400 tranny. Body, int need wk. $1000 obo. Laura (214)555-1234

● PC    price: $2.85

1966 Olds Delta 88: Less than 2000 mi on reblt 455. T400 Tranny Body, int need wk. $100 obo Laura (214)555-1234

○ newspaper    price: $3.65

1966 Olds Delta 88: Less than 2000 mi on reblt 455. T400 tranny. Body, int. need wk. $1000 obo. Laura (214)555-1234

○ PDA    price: $5.50

1966 Olds Delta 88: Less than 2000 mi on reblt 455 T400 tranny. Body, int need wk. $1000 obo. Laura (214)555-1234

● Mobile Phone    price: $4.25

1966 Olds Delta 88: Less than 2000 mi on reblt 455. T400

TOTAL PRICE: $7.10 X 4 days = $28.40

| 502 | 504 | 506 | 508 | 510 | 512 | 514 | 516 | 518 | 520 |
|---|---|---|---|---|---|---|---|---|---|
| LISTING NUMBER | ADVERTISER NAME | ADVERTISER ADDRESS | ADVERTISEMENT CLASSIFICATION(S) | PRICE | START DATE | END DATE | DISTRIBUTION DEVICE TYPE | DISTRIBUTION CHANNEL NETWORK | AD TEXT |
| 1 | SMITH,LAURA | 1 MAIN ST. HOMETOWN, TX | AUTOMOBILE:A34 | $2.85 | 12/06/01 | 12/09/01 | PC | INTERNET | 1996 Olds<bold> Delta 88</bold>:less than<CR> 2000 mi on reblt 455. T400 Tranny.<CR> Body, int need wk. $1000 obo. <CR> Laura (214)555-1234</end> |
| 2 | SMITH,LAURA | 1 MAIN ST. HOMETOWN, TX | AUTOMOBILE:A34 | $4.25 | 12/06/01 | 12/09/01 | MP | WAP | 1996 Olds Delta <CR> 88: Less than<CR> 2000 mi on<CR> reblt 455. T400<CR> tranny. Body, int<CR> needs wk. $1000 obo.<CR> Laura (214)555-1234</end> |

500 / 322

 Classifieds
Automotive

Dream it. Find It!

☐ Click here to place a classified ad

| Front Page | All Classifieds | Help | FAQs | Contact Us |

Saturday
December 1, 2001

CLASSIFIEDS
Employment
Automotive
Real Estate

TOOLS
Affordablity calculator

Monthly payments

Lease calculator

IN THE NEWS
Story index

- Village Ford Joins Pack
- GM names new Chairman

SPECIAL SECTIONS
- 2001 Dallas Auto Show
- The Global City

MORE
Help
FAQs
Click here to place a classified ad

↖ 810a

Auto Search
Search Automobile
Select one or more classifications and enter keywords you would like your search to include. Hold down "Ctrl" key to select multipule classifications or use the buttons below to speed up your selections.

Classification (total ads for All Days)

- 804a — Acura (816)
- 804b — Alfa Romeo (2)
- 804c — Antique Classic Collectible (244)
- 804d — Audi (98)
- 804e — Auto Truck Financing (7)
- 804f — Autos Trucks Wanted (24)
- 804g — BMW (622)
- 804h — Buick (192)

Ads basket
[View]
[Clear]

☐ Select All   ☐ Clear All   ☐ Invert All
↘ 802

Keyword search (optional)

[_____] ↘ 806

⦿ Any words (OR)
○ All words (AND)
○ Exact phrase

Dates to search     ← 808

☒ Sat, 12/01/01 (3706 ads)   ☐ Fri, 11/30/01 (3122 ads)
☐ Thu, 11/29/01 (1521 ads)   ☐ Wed, 11/28/01 (1540 ads)
☐ Tue, 11/27/01 (1342 ads)   ☐ Mon, 11/26/01 (1540 ads)
☐ Sun, 11/25/01 (3533 ads)

Number of Ads displayed per page
⦿ All  ○ 10  ○ 20  ○ 30  ○ 40  ○ 50

[ Search ] [ Reset ]

Town Hall

| D-FW |
| Top 200 |
| Companie |

| GuideLive |
| It's where to go |
| Movies ▼ |

Click here to go back to Automotive     ◢╱ 900

Your search for Integra
in Acura returned 3 ads.

_____

[          ] Ads basket. Check to add. Uncheck to remove.
'90 Integra, all pwr, 4dr. Auto, new engine. 104K. $1450 (214)727-9749    ◢— 902a Acura – The City Morning News – 11/29/2001

_____

[          ] Ads basket. Check to add. Uncheck to remove.
'94 Integra, all pwr, 5sp, elect sun-rf, 80K mi, new tires $5,000 (214)348-0204 ◢— 902b Acura – The City Morning News – 11/29/2001

_____

[          ] Ads basket. Check to add. Uncheck to remove.
'95 INTEGRA LS. 5 spd, silver, 52K, Alpine stereo. $9000. (972)226-3847    ◢— 902c Acura – The City Morning News – 11/29/2001

METHOD AND SYSTEM FOR OPERATING ONLINE CLASSIFIED ADVERTISEMENTS

RELATED APPLICATIONS

This application claims priority from co-pending U.S. Patent Application 60/251,704 filed Dec. 6, 2000 and U.S. patent application Ser. No. 10/008,491, entitled "Content Operating system," filed Nov. 13, 2001, which are incorporated herein by reference.

BACKGROUND OF THE INVENTION

1. Technical Field of the Invention

The present invention relates generally to advertising, and more specifically, but not by way of limitation, to an online classified advertisement management and distribution system.

2. Description of Related Art

Many publications, such as newspapers and periodicals that have classified advertisement sections utilize legacy or proprietary classified advertisement systems for publishing classified advertisements. The proprietary classified advertisement systems basically operate as order entry systems that publishers of the periodicals utilize to generate, format, and price the advertisement text for a particular printed periodical, such as a newspaper, for an advertiser. As understood in the art, proprietary classified advertisement systems are close ended in that the systems are not designed to output to any output source other than the particular printed periodical for which the system was originally designed. The proprietary classified advertisement systems, generally, are operated by employees of the periodical, and provide the employee with pricing information so that the employee can inform the advertiser of the classified advertisement of a price for the classified advertisement. The price is typically based on format, number of lines, location, days of the week, duration of the advertisement, etc., for the particular periodical and format thereof.

The proprietary classified advertisement systems are designed for a single input, single output configuration. In other words, classified advertisements are input by an order entry person and output is directed to the particular periodical. While manufacturers of the proprietary classified advertisement systems have attempted to adapt the proprietary classified advertisement systems for external networks and electronic publishing, many difficulties have been encountered due to outdated implementations and undocumented maintenance of the proprietary classified advertisement systems over the years. Furthermore, the few proprietary classified advertisement systems that have capability of posting classified advertising data to the Internet transmit the data from a flat-file feed of having proprietary codes associated with advertisement text, manually parse and remove the proprietary codes, and apply a content markup language, such HTML. Performing such operation is time consuming and expensive for the publisher.

While there exists conventional online types of classified advertisement systems or auction systems, such as Ebay, these systems are limited with regard to the input/output capabilities. For example, the output of these systems are limited to Internet publishing and searching of the classified advertisements and listings. The conventional online classified systems are unable to directly format the classified advertisements for multiple device types at the point of entry.

SUMMARY OF THE INVENTION

To overcome the problems of proprietary classified advertisement systems being limited to print distribution and online classified advertisement systems having limited input/output capability, an online classified advertisement system having the ability to interface with the proprietary classified systems and providing for multiple input/output capabilities has been developed. The online classified advertisement system provides for receiving advertisement data, such as text, from multiple input sources and provide access and/or distribute the classified advertisements to multiple distribution channels and devices. The online classified advertisement system, according to the principles of the present invention, provides for substantially simultaneously formatting and pricing the advertisement information for the multiple distribution channels and devices.

One embodiment according to the principles of the present invention includes a system and method for pricing a classified advertisement. The method includes receiving a classified advertisement from an advertiser to be distributed to at least one of multiple device types. The classified advertisement may be substantially simultaneously formatted for at least two of the device types. The classified advertisement may be displayed as formatted for presentation by the device type(s). A price may be determined and displayed for the classified advertisement as formatted for presentation by the device type(s).

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 3 is an exemplary order entry page for the online classified advertisement system of FIG. 1;

FIG. 5 is an exemplary listing of a portion of a database for information entered into the online classified advertisement system of FIG. 1;

FIG. 8 is an exemplary search page for searching the database(s) of FIG. 3;

FIG. 9 is an exemplary listing of a search result from the database of FIG. 5 utilizing the search page of FIG. 8.

DETAILED DESCRIPTION OF THE EXEMPLARY EMBODIMENTS OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Proprietary classified advertisement systems are limited in that they are designed for single input/single output uses. In other words, the proprietary classified advertisement systems are utilized by newspapers and/or periodicals and are not adapted to be utilized for publishing classified advertisements across networks, such as the Internet, external of the publication of original design. Additionally, the proprietary classified advertisement systems utilize flat-file feeds of the ad text having proprietary codes associated therewith, manually parse and remove the proprietary codes, and apply a content markup language, including HTML or other format, for listing the classified advertisements. Conventional online classified and/or auction systems, such as Ebay, too, are limited that they are designed for single input (online) and single output (online).

With the advancement in technology, many different types of devices are available for distribution of data across many different channels or networks. Such devices may include mobile phones, satellite phones, personal digital systems (PDA), and email devices, such as pagers. Many different protocols also exist for delivery of content to these devices. For example, the wireless application protocol (WAP) provides for devices to communicate to a network with data other than voice data. Other protocols exist that different types of devices may utilize, including satellite and paging systems, for example.

The principles of the present invention include an online classified advertising system that provides for multiple input and multiple output of classified advertisements. Advertisement text may be entered into one text box and substantially simultaneously formatted and priced for multiple output device types and/or channels based on text. The classified advertisements may be stored as objects by utilizing objects for distribution, the advertiser and publisher may treat the distribution channels and output devices as a black box and be accessed and/or distributed on multiple channels to multiple device types utilizing a content operating system.

Figure 1:
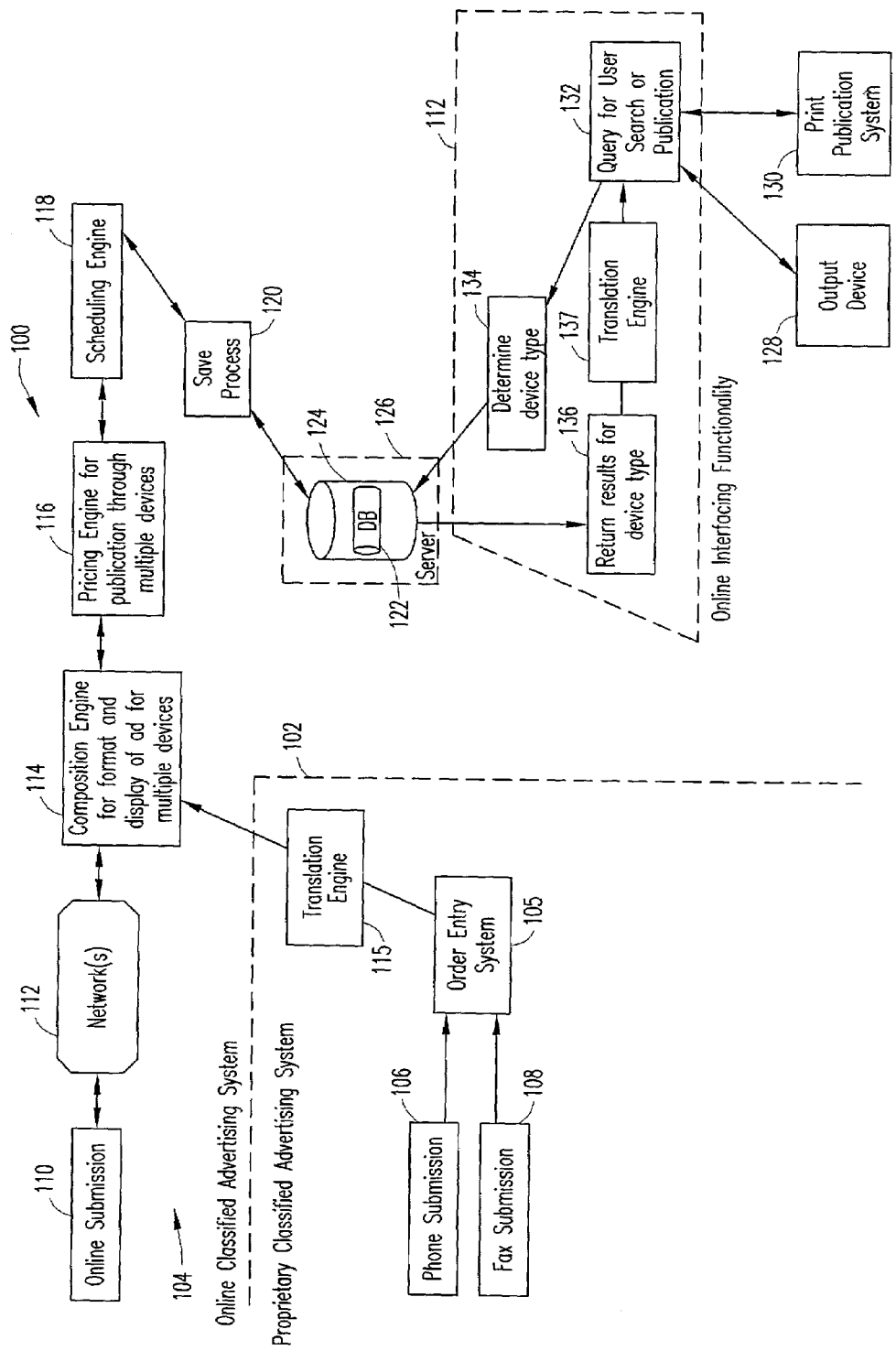
FIG. 1 is an exemplary block diagram of a proprietary classified advertisement system in communication with an online classified advertisement system according to the principles of the present invention.

FIG. 1 is an exemplary block diagram 100 of a proprietary classified advertisement system 102 in communication with an online classified advertisement system 104 according to the principles of the present invention. The proprietary classified advertisement system 102 used for receiving and entering classified advertisements for use in a printed publication, such as a newspaper, includes an order entry system 105 for receiving the classified advertisement information from a phone submission 106 or a fax submission 108. The classified advertisement information is entered by an employee operating the order entry system 105. As is understood in the art, the order entry system 105 operates to format and paginate the classified advertisement text for the particular publication that the order entry system 105 is designed. In other words, the order entry system 105 performs a single formatting function and is limited to formatting for the particular publication.

The online classified advertisement system 104 according to the principles of the present invention may receive the classified advertisement from the proprietary classified system 102 and an online submission at 110. The online submission 110 may include receiving information for the classified advertisement from a variety of devices and distribution channels. For example, the devices may include personal computers (PC), web-enabled mobile phones, personal digital assistants (PDA), and voice activated systems. The online submission 110 may be communicated across at least one network 112, where the network(s) may include the Internet, wireless application protocol networks, satellite networks, and (wireless) ethernet.

A composition engine 114 may receive the classified advertisement information from the online advertisement system 104 and the proprietary classified advertisement system 102. The composition engine may substantially format and display the advertisement for multiple devices. As will be further explained herein below, the formatting of the classified advertisement text may be different for different devices. For example, the format of the ad text for a PC is different than for a web-enabled mobile phone due to screen size and display capability differences.

A pricing engine 116 may be utilized to price the classified advertisement for publication on the different devices. The result of the pricing engine may be returned to the device performing the online submission 110 and the order entry system 105 so that the advertiser may be presented the price for providing accessibility to the classified advertisement for the different output devices.

A scheduling engine 118 may be utilized in conjunction with at the pricing engine for receiving and determining a schedule for the classified advertisement. The pricing engine may utilize the schedule received by the advertiser for pricing the classified advertisement for the distribution channel and devices. The pricing engine may further compute a total price for the classified advertisement based on the format (e.g., number of lines) and schedule for the classified advertisement. At 120, the classified advertisement may be saved to a database 122 located in a storage device 124 operated by a server 126. It should be understood that the composition engine 114, pricing engine 116, and scheduling engine 118, and save process 120 may be executed by the server 126 or, alternatively, be executed in another server (not shown) operating on the network 112. In another embodiment, the engines 114–120 may be executed on the devices for performing the online submission of 110.

On the distribution side, a user system 128, such as a PC or mobile phone, may be utilized to perform a search of the classified advertisement information stored in the database 122. Alternatively, a print pagination system 130 that may or may not be part of the proprietary classified advertisement system 102 may perform a search of the database 122 for printing the classified advertisement in a publication. The user 128 and print 130 systems may perform a query or search at 132 for the output device 128 or print publication system 130. In performing the search at 132, the device type is determined at 134 so that the database 122 may be properly searched for classified advertisements that have been formatted for the device type being operated by a user and scheduled for that time period. The results of the search of the database 122 are returned at 136 to the user 128 or print system 120.

Figure 2:
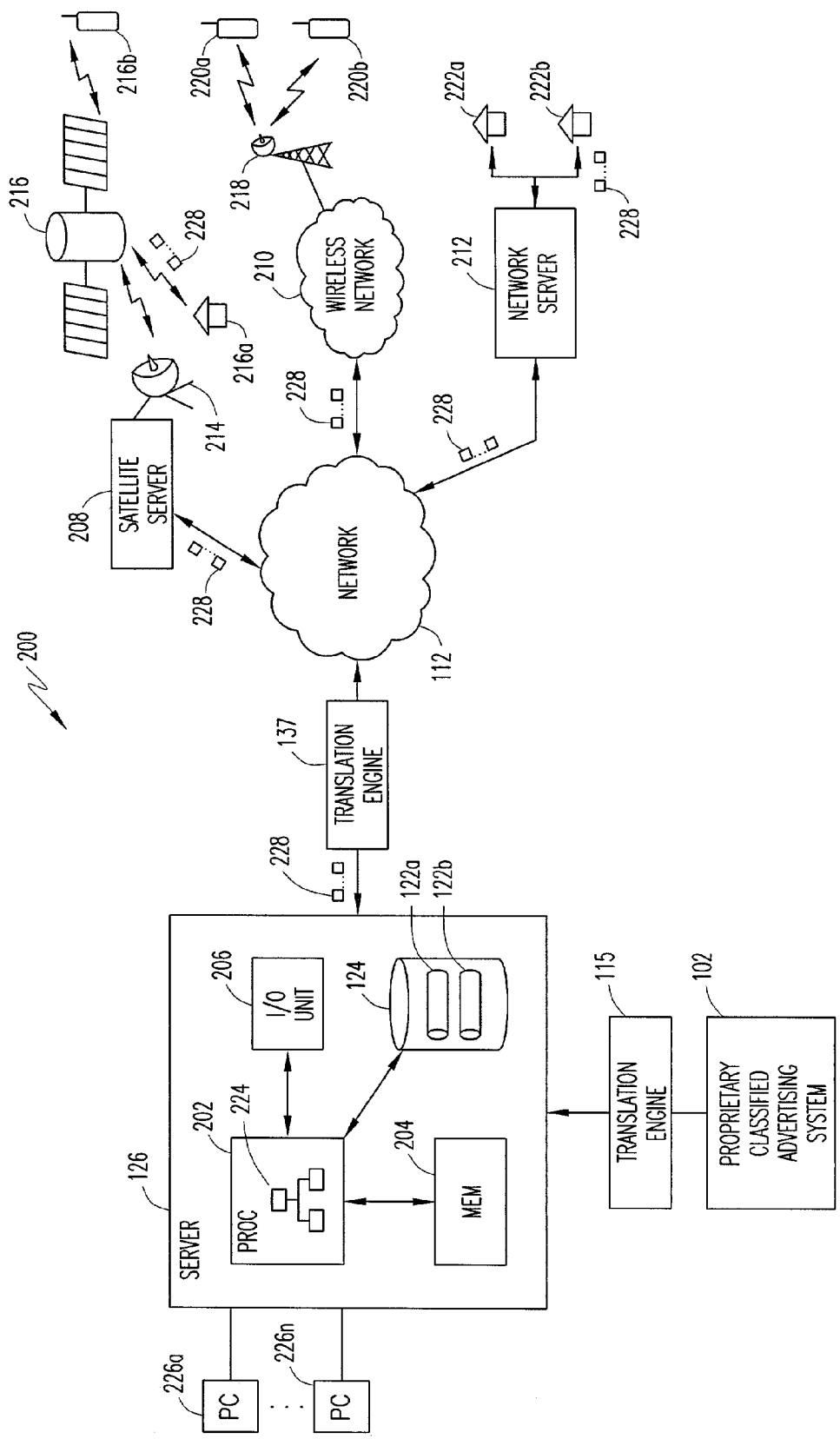
FIG. 2 is an exemplary block diagram of a server for operating the online classified advertisement system of FIG. 1 in communication with multiple distribution channels and devices.

FIG. 2 is an exemplary block diagram 200 of a server for operating the online classified advertisement system of FIG. 1 in communication with multiple distribution channels and devices. As shown, the proprietary classified advertisement system 102 is coupled to the server 126 operating the classified advertisement system 104 via the translation engine 115. The server 126 includes a processor 202 coupled to a memory 204, I/O unit 206 and storage device 124. The database 122 may include more than one database 122a and 122b for storing the data in various relational manners. The server 126 is coupled to at least one network 112, such as the Internet, which may further be coupled to a satellite server 208, cellular network 210, and network server 212.

The satellite server 208 is coupled to an antenna 214 to communicate with a satellite 216. The satellite relays signals to the antenna 214 to subscribers 216a and 216b. The cellular network 210 includes a cellular infrastructure (not shown), such as base stations (not shown) and antennas 218 for communicating with subscribers 220a and 220b of the wireless network 210. The network server 212 may be any server operable to service subscribers 222a and 222b of the network 112.

In operation, the processor 202 executes at least one software program 224 operates the online classified advertising system. The software program may interface with a database software program, such as Oracle™, to receive and store the classified advertisement information or data. The software program may include the composition engine 114, pricing engine 116, and scheduling engine 118, for example, to provide users of the online classified advertisement system to input the classified advertisement information into the system and receive pricing information based on the scheduled times and format of the classified advertisement. As understood in the art, PCs 226a–226n coupled to the server 126 may communicate with the server to utilize the online classified advertisement system for entering the classified advertisement information. Alternatively, the classified advertisement information may be received from subscribers (e.g., 220a and 222a) operating on the network 112.

The classified advertisement data may be stored in the database 122 in an object oriented format. The server 126 provides for the subscribers to review and search the classified information stored in the database 122. As understood in the art, communication between the server 126 and the subscribers is performed utilizing data packets 228. The translation engine 137 may convert the data being communicated from the server 126 to any channel (e.g., satellite) communicating with the server 126 using rules associated with distribution channels and/or output devices. Alternatively, the classified advertisement information stored in the database 122 may be communicated to another location, such as the network server 212, located on the network 122 for subscribers 222 to search and view. The distribution aspect of the online classified advertisement system 104 is further discussed herein with regard to FIGS. 10A and 10B.

FIG. 3 is an exemplary order entry page 300 for entering a classified advertisement into the online classified advertisement system 104. The order entry page 300 includes advertiser information 302, such as name, address, and phone number, and payment information 304, such as payment type, credit card number, and credit card expiration date. Further included may be an advertisement classification 306, which may include "super" classifications and "sub" classifications for selection via a radio button or other selection soft-tool, such as a pull-down menu. As shown, a radio button 308 is selected for "Automobile". By selecting the automobile super-classification, sub-classifications of automobiles appears in a scroll menu 310 in which an "OLDSMOBILE" item 312 is selected. By selecting the OLDSMOBILE item 312, the online classified advertisement system 104 is directed to place the classified advertisement.

The order entry page 300 further includes an advertisement period 314, such as a start and stop date. Alternatively, the advertisement period 314 may include a start date and a selectable number of days extending therefrom. Another embodiment may include weekends only, Sundays only, or any other combination of weekdays and weekends. A text box 316 may be included to provide the advertiser with additional comments or instructions for the operator of the online classified advertisement system 104.

An advertisement text section 318 of the order entry page 300 operates to receive and display formatted text of the advertisement. A text box 320a may be utilized by the operator to enter advertising (ad) text 322 of the advertisement. Multiple other text boxes 320b–320e may be included to substantially simultaneously display the ad text 322 in a format for selectable output devices that the classified advertisement may be displayed. As shown, text box 320b is formatted for a newspaper, text box 320c is formatted for a PC, text box 320d is formatted for a PDA, and text box 320e is formatted for a mobile phone. Each of the text boxes 320b–320e are sized for an approximate display size of the different devices.

Alternatively, it should be understood that the advertisement text section 318 may be located on a separate order entry page 300 and that the text boxes 320b–320e are not necessarily updated real-time. In another embodiment, the text box 320a is not included, and that the ad text 322 is entered into one of the other text boxes 320b–320e. However, by utilizing the text box 320a, the ad text 322 in each of the text boxes 320b–320e may be individually edited and formatted. For example, the ad text 322 in the text box 320b for the newspaper may have particular words bolded while allowing ad text 322 for the mobile phone to remain regular font.

Each of the text boxes 320b–320e has an associated price box 324b–324e in which the price for the classified advertisement is listed. The price for each of the classified advertisements is determined based on a number of factors, including number of lines, font, output device, etc. as understood in the art. A total price 326 may be computed based on output devices selected by the user using software selectors 328a and 328b. As shown, the total price $28.40 is computed by adding the price for running the classified advertisement for providing access to PC and mobile phones multiplied by the number of days for the classified advertisement to run (i.e., four days) ($2.85+$4.25=$7.10*4=$28.40). By substantially simultaneously formatting the ad text 322 for the different classified output devices, the advertiser may determine different options and distribution channels for which to run the classified advertisement. As technology continues to develop, output devices may be added to the advertisement text section.

Figure 4:
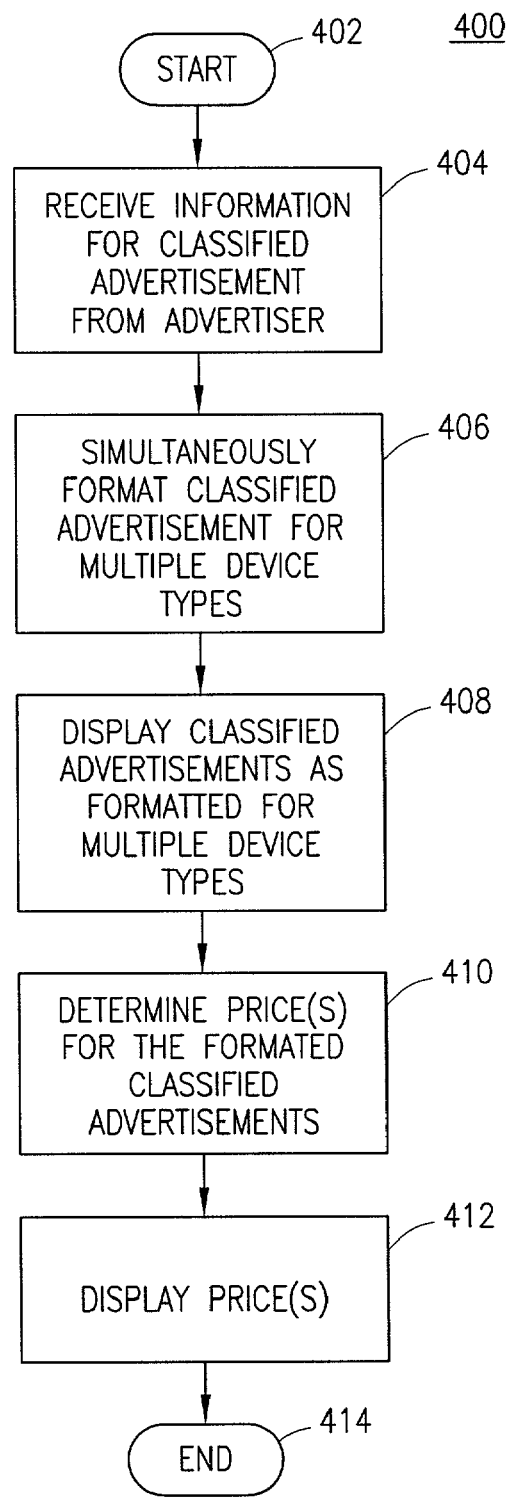
FIG. 4 is an exemplary flow diagram for operating the order entry page of FIG. 3.

FIG. 4 is an exemplary flow diagram 400 for operating the order entry screen 300. The process starts at step 402. At step 404, information for the classified advertisement is received from the advertiser. The information generally includes the ad text 322, but may additionally include a graphic, such as a photograph or line art. At step 406, the classified advertisement (e.g., ad text 322) may be substantially simultaneously formatted for multiple output device types. At step 408, the classified advertisements may be substantially simultaneously displayed as formatted for the multiple device types. Alternatively, the classified advertisements may be displayed only for the selected output devices. Yet another embodiment may include displaying the classified advertisements on different screens. Price(s) for the formatted classified advertisements are determined at step 410 and displayed at step 412. The price(s) may be displayed for all or just the selected output devices for which to provide access to the classified advertisement. The total price for the classified advertisement may be additionally computed and displayed. The process ends at step 414.

FIG. 5 is an exemplary listing of a portion of the database 122 for information entered into the online classified advertisement system 104. The database may include a listing number 502 for the advertiser 504. The advertiser's address 506 may additionally be included. The selected advertisement super-classification and sub-classifications 508 or a code (e.g., A34) indicative thereof may be included. A price 510, start date 512, and end date 514 also may be included. The selected distribution device type 516, such as PC or MP (i.e., mobile phone), may be included along with a distribution channel or network 518, which may be selected, if provided on the order entry page 300, by the advertiser or automatically determined by the online classified advertisement system 104 based on the selected output device.

An ad text field 520 may include content markup language indicators that provide for the formatting of the ad text 322. As shown the ad text 322*b* includes descriptors (e.g., <bold> and </bold>) to indicate special formatting for the ad text to be accessible to a PC operating on the Internet. Various types of content markup languages, such as hypertext markup language (HTML), extensible markup language (XML), and wireless markup language (WML), may be utilized based on the selected output devices and distribution channels. Different records and/or objects may be utilized to store the classified advertisement orders by an advertiser based on the selected output devices and/or channels. It should be understood that other relational database configurations may be utilized so that the advertisements are stored as a single record as understood in the art. Further, it should be understood that the data may be stored in an object oriented or other suitable format.

Figure 6:
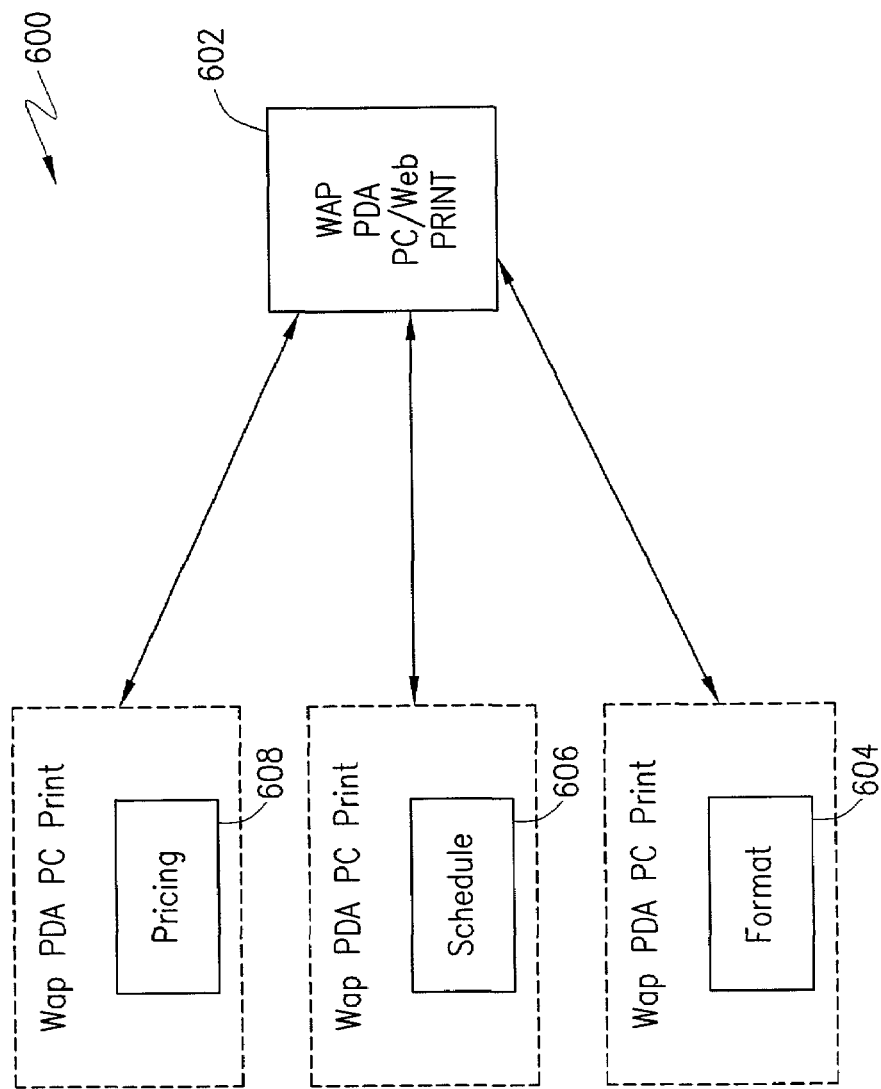
FIG. 6 is an exemplary data structure of objects for operating the online classified advertisement system of FIG. 1.

FIG. 6 is an exemplary data structure 602 including objects for operating the online classified advertisement system 104. A text object 602 may be utilized to display the ad text 322 for the classified advertisement. The text object 602 may be associated and/or linked with objects for handling format, schedule, and pricing for the classified advertisement.

A format object 604 may be utilized to handle formatting the ad text 322. The format object may receive the ad text 322 as entered, determine the number of characters entered, and automatically add a carriage return (e.g., <CR>) or end-of-line indicator to the ad text 322. Other formatting as understood in the art may be applied to the ad text 322. Additionally, the format object may format the ad text 322 for the different distribution channels and devices. For example, text and graphics may include HTML tags for PC. Text for a PDA may include HTML tags, text for a mobile phone may include WML tags, and print may include line spacing, column width, text kerning, font type, and font size.

A schedule object 606 may be utilized to handle scheduling the classified advertisement. The scheduling object 606 may receive the start and stop dates and actively schedule the classified advertisement with a scheduler (not shown) to provide access to the classified advertisement by the selected output devices.

A pricing object 608 may be utilized to determine and post a price for each of the output devices and/or distribution channels. The pricing object 608 may operate in real-time or semi-real-time so that the price for each of the classified advertisements may be posted on the order entry page 300. As understood in the art, pricing of classified advertisements may become very complicated depending on the formatting, scheduling, distribution, and classifications, for example, desired by the advertiser. For example, for a PC, price per instance, duration of the advertisement, and additional charges for links and graphics may be computed. For a PDA, price per instance and duration of the advertisement may be computed. For a mobile phone, price per instance, duration of the advertisement, and additional charges for links and graphics may be computed. For print media, price per instance, duration, placement of the advertisement, and additional charges for graphics, design, links, etc., may be computed. The pricing object 608 may access a pricing table (not shown), which may be maintained in a separate database.

Figure 7:
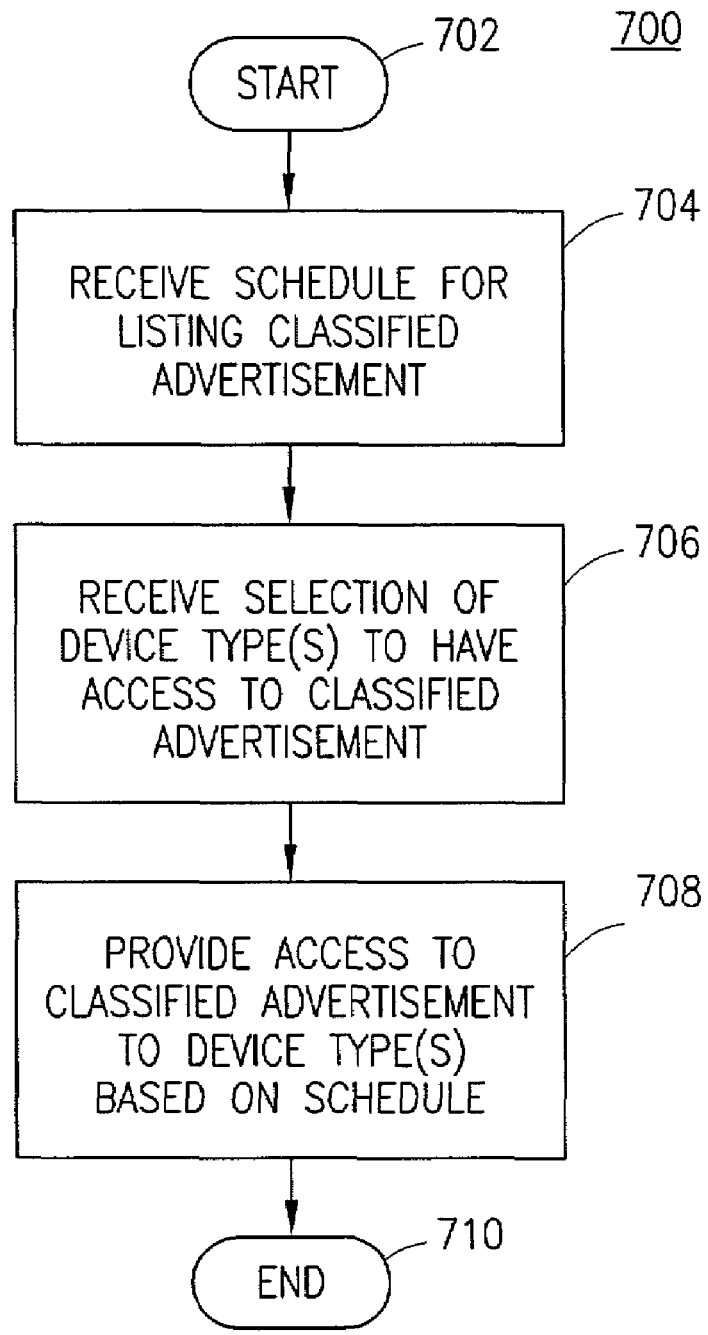
FIG. 7 is an exemplary flow chart for providing access to the classified advertisements stored in the database of FIG. 5.

FIG. 7 is an exemplary flow chart 700 for providing access to the classified advertisements to at least one of multiple device types stored in the database 500. The process, which may be executed by a software program executed by the processor 202 (FIG. 2), starts at step 702. At step 704, a schedule for listing or providing access to the classified advertisement is received. At step 706, a selection of the device type(s) to have access to the classified advertisement may be received. At step 708, access to the classified advertisement to the device type(s) based on the schedule is provided. Access to the classified advertisement may include setting a flag in the database or determining that a current date is within a date range for which the classified advertisement is to be accessible by the device type(s), such as a mobile telephone. In providing accessibility to the classified advertisement, the classified advertisement, possibly in the form of an object, may be distributed to a different database, network location, or website.

FIG. 8 is an exemplary search page 800 for searching the database 322. The search page 800 is one from a PC accessing the database 322 on the Internet. As shown, the search page 800 provides a selection box 802 having selectable sub-categories 804*a*–804*h*. The "Acura" sub-category 804*a* is highlighted, indicating that Acura automobiles are to be searched. Additionally, a search text box 806 may be included for performing searches with specific search terms as understood in the art. Date selectors 808 may be provided to allow a user to search for listed advertisements on one or more date. Other links 810*a* and 810*b* related or unrelated to classified advertisements may be included in the search page 800.

FIG. 9 is an exemplary listing of a search result from the database of FIG. 5 utilizing the search page 800. Three classified advertisements 902*a*–902*c* meeting the search requirement (i.e., Acura Integra) are distributed to the device (e.g., PC) from which the search was performed. The classified advertisements 902*a*–902*c* may be communicated as objects from the server 126 via the network 112.

Figure 10A:
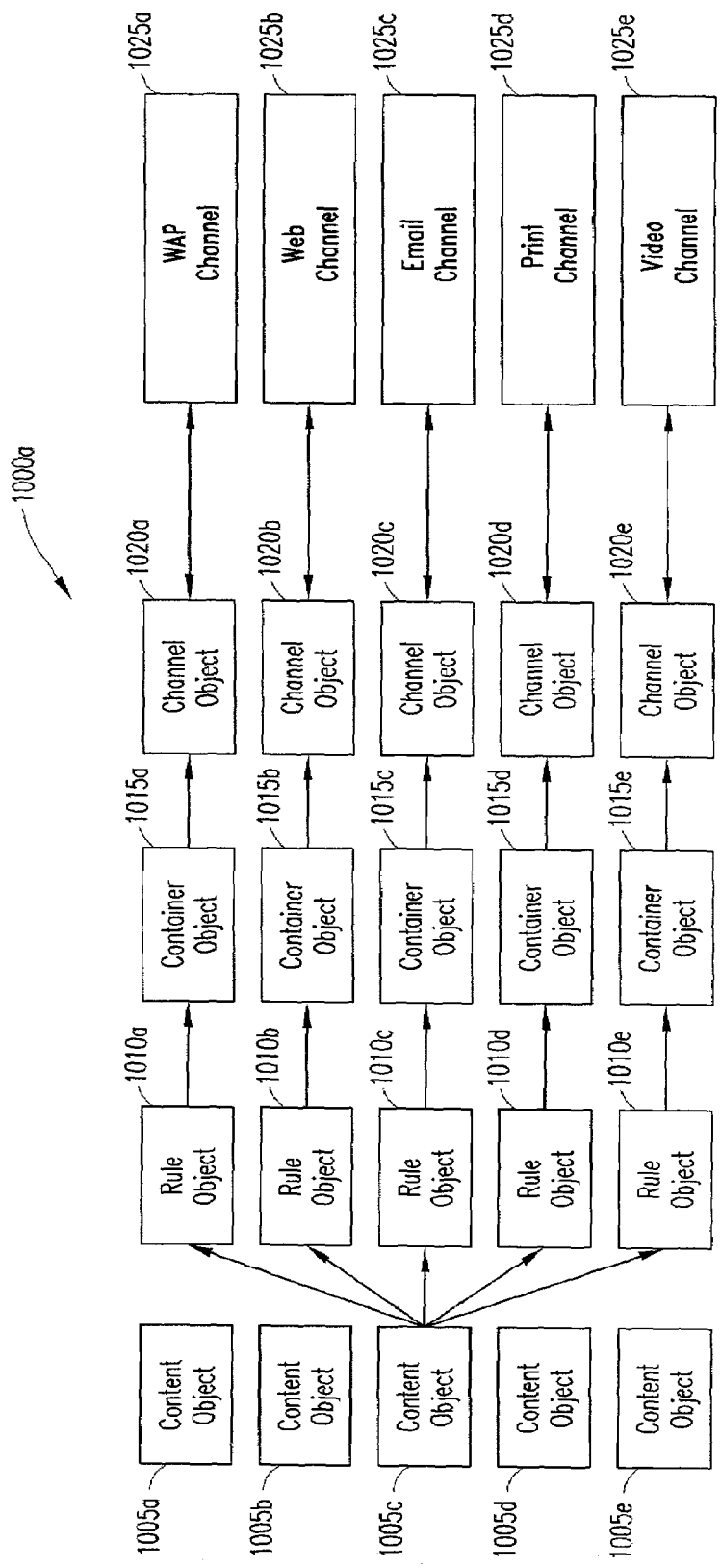
FIGS. 10A and 10B are exemplary block diagrams of a structure or content operating system for distribution of the content of the database of FIG. 5 to the network and devices of FIG. 2.
Figure 10B:
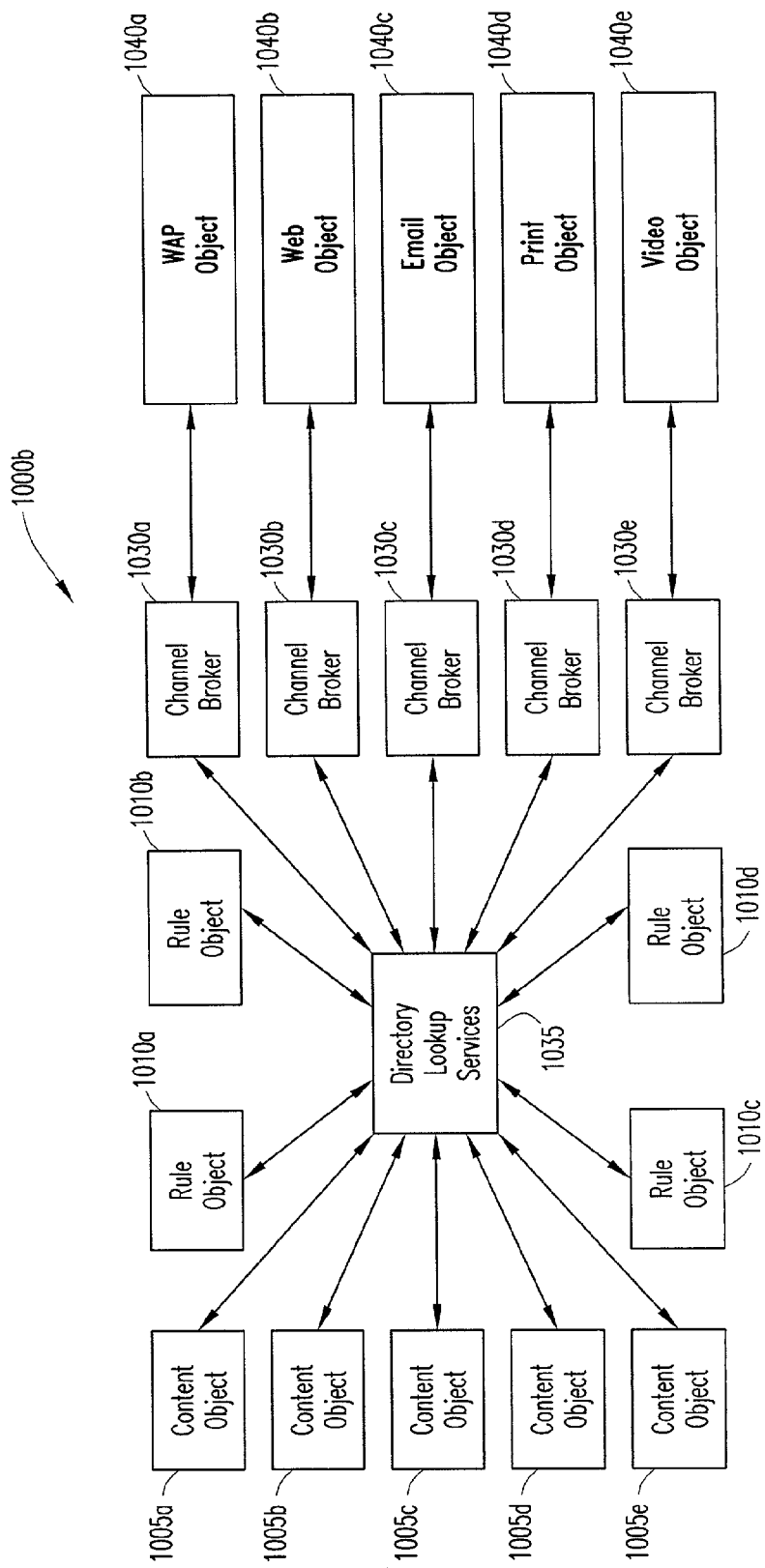

FIGS. 10A and 10B are exemplary block diagrams of a structure or content operating system 100*a* and 100*b* for distribution of the classified advertisements of the database 500 to the network 112 and devices (e.g., 220*a*). Various aspects of the system have been separated into distinct objects, including: (i) content objects 1005*a*–1005*e* (collectively 105) (ii) rule objects 1010*a*–1010*e* (collectively 1010), (iii) container objects 1015*a*–1015*e* (collectively 1015), and channel objects 1020*a*–1020*e* (collectively 1020). As shown, the content object 1005*c* may be a classified advertisement having ad text 322 and/or image data (e.g., photograph) produced by an advertiser, which may be an individual or commercial enterprise. The content object 1005c may be produced by the classified advertisement provider without regard to a particular channel or output device. Generally, however, the content object 1005c is developed for a distribution channel and terminal having the highest bandwidth and resolution, respectively, as data is more easily removed than added from an image.

Rule objects 1010, which provide the rules that the content objects are subject to, may be utilized to prepare or alter the content objects 1005 based on the particular channel and/or output device for which the content object 1005 is destined. For example, if a content object 1005 containing a classified advertisement is distributed to a personal computer via the web, the content object 1005 follows a web rule for channel distribution and a personal computer rule for display. Or, if a content object 1005 containing a photograph is sent to an e-mail address, the content object 1005 follows an e-mail rule for a distribution channel and a personal computer rule for a terminal display.

A container object 1015, which may be considered a content object container, may be an object version of what are sometimes called templates. To follow the previous example, if a content object 1005c is composed of text, the rule object 1010b having web rules is followed. The rule object 1010b may know which content container object 1015b to call to make it look like a particular publisher's environment (e.g., Morning News page). In other words, the rule object 1010b knows what the rules are for the channel and terminal (i.e., output device) to which the content object 1005c is to be displayed. Additionally, the rule object 1010b knows into which display container 1015b that the content object 1005c is to flow. It should be understood that the rules for a wireless network distribution channel to a mobile phone or pager terminal are different than those for the Internet to a personal computer.

The channel object 1020 may be a channel or a way of sending the content object 1005c via a container object 1015b to whatever channel 1025b the content object is destined—whether that channel 1025 be WAP 1025a, web 1025b, e-mail 1025c, print 1025d, or video 1025e, for example. It should be understood that other channels 1025 may be utilized or that new channels may be added. While the structure shown is linear (i.e., one rule 1010, container 1015, and channel 1020 object per channel), it should further be understood that there may be many rule objects 1010 per channel 1025 and provided in a variety of different configurations. Whether a database (not shown) or an independent object oriented system is utilized for storing the data published and maintained by the online classified advertisement system 104, the basic concept according to the principles of the present invention is that a separate content object for each classified advertisement may exist. Alternatively, multiple pieces of associated classified advertisements (e.g., same advertisement selected to be accessible to multiple output devices) may be included in a single content object 1005.

Pragmatically, once the classified advertisement is edited, the rule objects 1010 allow different distribution of that classified advertisement without having to hand-edit each content object 105 for different distribution channels and/or terminals. If, for example, the advertiser says, "Okay, I'm going to provide access to this advertisement for personal computers.", the access and distribution of the classified advertisement happens automatically by formatting the classified advertisement in the form of a content object 105c, transmitting the content object to the appropriate rule object 110b, applying the appropriate container object 115b, and communicating the packaged content object 105c via the channel object 120b to the web channel 125b. The web rule 110b knows what container object 115b is needed for any particular website utilizing the web rules. Utilizing objects allows the publisher to distribute the classified advertisements in non-flat file formats, thereby substantially reducing or eliminating processing time be advertisement editors.

The distribution aspect and operation of the content operating systems 1000a and 1000b may be as automatic as the rule objects 110 may be defined. For example, if a change to the "looks" of a distribution medium is necessary (e.g., if a web publisher's template is to change), the rule object 1010 and/or container object 1015 simply needs to change accordingly. The advertiser and publisher of the classified advertisement does not have to know anything external to the creation of the content object 1005, and the advertiser and publisher may continue to publish the classified advertisement as before. Accordingly, the classified advertisement continues to be properly distributed. Essentially, the distribution of the classified advertisement operates as a "black box" from the advertiser and publisher's point-of-view.

In one embodiment, an advertisement containing a video clip may be requested by and destined for a hand-held device, such as a PDA. One rule object 1010 may include a rule, "streaming video onto a cellular channel to be viewed by PDA devices requires a reduction of the video from X frames and Y pixels/inch to be X' frames and Y' pixels/inch". The rule may be applied in a number of different ways as understood in the art. The rule object 1010 may further contain a whole set of rules for the kind of presentation terminal that the content object 1005 ultimately is displayed. Another rule object 1010 may contain a set of rules for a video channel, such as high-definition television (HDTV), that requires high resolution and high frame rates. The bottom line is that the rule objects 1010 may define the processes for which the content objects 1015 are subject to in order to properly distribute and present the classified advertisement contained in the content object 1005.

The container object 1015 may include a set of display or presentation rules or processes for a particular channel 1025. For example, a container object 1015b for the web may contain a set of extensible stylesheet language (XSL) or hypertext markup language (HTML) templates, as understood in the art, so that advertisements, for example, and other components may be pieced together by the rules based on the particular set of rules. Whether the set of rules are for the publisher's readership or a another publisher, because each of these templates are kept in a separate set of container objects 1015, the classified advertisement itself need not be re-edited for each readership as each template is predetermined. Additionally, for any distribution channel (e.g., website, e-mail, WAP, print, etc.) the same classified advertisement may be sent using different rule sets and be properly distributed to a particular distribution channel 1025.

The channel object 1020 may be basically a way of hooking together the database or system on the content production side to the output or distribution system (e.g., HTTP engine, SMTP engine, WML to WAP channel). It should be understood that the channel object 1020 may include hardware and/or software for processing and distributing the content as understood in the art.

FIG. 10B is another exemplary embodiment of a content operating system 1000b having a different architecture from the content operating system 1000a. While the results of the different architectures may be substantially the same, the architecture of the content operating system 1000*b* allows for a more distributed architecture. As shown, the content objects 1005 may be the same and the rule objects 1010 may be the same. However, standard high-end object services are included that content management systems generally do not include. In particular, content management systems generally make use of present distribution standards to negotiate for entry into the network processing. Object brokers 1030*a*–1030*e* (collectively 1030) for directory lookup services 1035 may be part of common object request broker architecture (CORBA), Genie, or other known object technologies. The object broker 1030 may negotiate between a client (not shown) and a distribution object 1040*a*–1040*e* (collectively 1040)—an abstraction layer that allows a WAP phone or an e-mail client to talk to a set of objects without having to know the rules for the objects.

A CORBA point may be initially set up and the objects (e.g., content 1005, rule 1010, container 1015, etc.) may be CORBA compliant. The client should be CORBA compliant so that the CORBA objects basically negotiate between the client and the objects. The directory lookup service 1035 may operate as a self-negotiating object architecture, which basically dictates that in a self-negotiating object network, a directory exists where objects are self-registered. For example, a rule object 1010*a* may make itself known to the directory look-up service 1035, which then allows clients to request the rule object 1010*a* for processing a content object 1005. The directory simply has a list of objects that exist and are currently operating. The directory lookup service 1035 may provide for a distributed network of objects available to perform processing in a dynamic manner based on availability of resources operating the objects. It should be understood that the directory lookup services may be centrally located or distributed to handle requests from clients and object brokers 1030 to process and distribute the content objects 1005 over a variety of different distribution channels to a variety of output devices.

The previous description is of a preferred embodiment for implementing the invention, and the scope of the invention should not necessarily be limited by this description. The scope of the present invention is instead defined by the following claims.

What is claimed is:

1. A method comprising:
    receiving, by a composition engine, text of a classified advertisement from an advertiser;
    separately formatting the text of the classified advertisement for publication by at least two of a plurality of device types;
    simultaneously displaying the classified advertisement text on a display as separately formatted for each of the at least two device types;
    determining a publication price, by a pricing engine, for the classified advertisement as formatted for each of the at least two device types; and
    simultaneously displaying each publication price in association with its corresponding displayed classified advertisement text on the display.

2. The method according to claim 1, further comprising receiving at least one selection for at least one of the device types to distribute the classified advertisement.

3. The method according to claim 1, further comprising receiving a selection for a category to place the classified advertisement.

4. The method according to claim 1, further comprising receiving a start date to begin running the classified advertisement.

5. The method according to claim 1, wherein the classified advertisement includes an image.

6. The method according to claim 5, wherein the image is a photograph.

7. The method according to claim 1, wherein the advertiser of the advertisement includes at least one of an individual and a commercial enterprise.

8. A system comprising:
    submission means for receiving text of a classified advertisement from an advertiser;
    composition engine means for separately formatting the text of the classified advertisement for publication by at least two of a plurality of device types;
    pricing engine means for determining a price for the classified advertisement as formatted to be published by each of the least two device types; and
    means for simultaneously displaying the classified advertisement text as separately formatted for each of the display types on a display along with the determined price for publication.

9. The system according to claim 8, further comprising means for receiving at least two selections for at least two device types to distribute the classified advertisement.

10. The system according to claim 8, further comprising means for receiving a selection for at least two categories to place the classified advertisement.

11. The system according to claim 8, further comprising means for receiving a starting date to run the classified advertisement.

12. A graphical user interface (GUI) for providing a user input interface to place a classified advertisement, comprising:
    a text area, in said GUI, programmed to receive text for the classified advertisement;
    a plurality of text display areas on a single screen, in said GUI, operable to simultaneously display the received text for the classified advertisement, the classified advertisement text separately displayed in the text display areas having different publication formats; and
    a plurality of price display areas in said GUI, each of the plurality of price display areas being associated with a different text display area and operable to display a price for publishing the advertisement based on the publication format of the text in the associated text display area.

13. The method according to claim 12, wherein each of the plurality of text display areas represent a different publication device having access to the classified advertisement.

14. The method according to claim 12, wherein the different formats include a different number of characters per line.

15. The method according to claim 12, wherein the text in each of the text display areas are individually editable.

16. The method according to claim 12, wherein each price is based on a number of text lines in the associated text display area.

17. A system, comprising:
    a submission system to receive text of a classified advertisement from an advertiser;
    a composition system that separately formats the text of the classified advertisement in a first format for publication by a first device type and a second format for publication by a second device type;
    a display device for simultaneously displaying the classified advertisement text as separately formatted in each of the first and second formats;

a pricing system that determines a price for publishing the classified advertisement in each of the first and second formats; and a communications system for communicating the first formatted classified advertisement to the first device type for publication thereby and for communicating the second formatted classified advertisement to the second device type for publication thereby.

18. The system of claim 17 wherein the composition system further supports independent editing of the classified advertisement text as simultaneously displayed in both the first and second formats.

19. The system of claim 17 further comprising means for displaying the determined price for publication of the classified advertisement text in both the first and second formats.

20. The system of claim 19 wherein the means for displaying displays a price for publication associated with each individual one of the first and second formats.

21. The system of claim 17 wherein the communications system communicates the first formatted classified advertisement to the first device type over a first communications channel and communicates the second formatted classified advertisement to the second device type over a second communications channel, and wherein the composition system further formats the text of the classified advertisement in a first channel format for communication over the first communications channel and formats the text of the classified advertisement in a second channel format for communication over the second communications channel.

22. A method, comprising:
receiving text of a classified advertisement from an advertiser;

separately formatting by a composition engine the text of the classified advertisement in a first format for publication by a first device type and a second format for publication by a second device type;

simultaneously displaying the classified advertisement text as separately formatted in each of the first and second formats;

determining by a pricing engine of a price for publishing the classified advertisement in each of the first and second formats; and communicating the first formatted classified advertisement to the first device type for publication thereby and communicating the second formatted classified advertisement to the second device type for publication thereby.

23. The method of claim 22 further comprising allowing by the composition engine of independent editing of the classified advertisement text as simultaneously displayed in both the first and second formats.

24. The method of claim 22 further comprising displaying the determined price for publication of the classified advertisement text in both the first and second formats.

25. The method of claim 24 wherein displaying comprises displaying a price for publication associated with each individual one of the first and second formats.

26. The method of claim 17 wherein the first formatted classified advertisement is communicated to the first device type over a first communications channel and the second formatted classified advertisement is communicated to the second device type over a second communications channel, and wherein formatting by the composition engine comprises formatting the text of the classified advertisement in a first channel format for communication over the first communications channel and formatting the text of the classified advertisement in a second channel format for communication over the second communications channel.

* * * * *

UNITED STATES PATENT AND TRADEMARK OFFICE
CERTIFICATE OF CORRECTION

| | | |
|---|---|---|
| PATENT NO. | : 7,062,466 B2 | Page 1 of 3 |
| APPLICATION NO. | : 10/006765 | |
| DATED | : June 13, 2006 | |
| INVENTOR(S) | : Lisa M. Wagner et al. | |

It is certified that error appears in the above-identified patent and that said Letters Patent is hereby corrected as shown below:

Column 4, line 32

Replace "with at the pricing"
With --with the pricing--

Column 11, lines 56-58, Claim 1

Replace "simultaneously displaying each publication price in association with its corresponding displayed classified advertisement text on the display,"

With --simultaneously displaying each publication price in association with its corresponding displayed classified advertisement text on the display; and computing, by the pricing engine, of a total price based on a selection of the device types to provide access to the classified advertisement.--

Column 12, lines 14-16, Claim 8

Replace "pricing engine means for determining a price for the classified advertisement as formatted to be published by each of the at least two device types; and"

With --pricing engine means for determining a price for the classified advertisement as formatted to be published by each of the at least two device types and for computing a total price based on a selection of the device types to provide access to the classified advertisement; and--

UNITED STATES PATENT AND TRADEMARK OFFICE
CERTIFICATE OF CORRECTION

PATENT NO. : 7,062,466 B2
APPLICATION NO. : 10/006765
DATED : June 13, 2006
INVENTOR(S) : Lisa M. Wagner et al.

It is certified that error appears in the above-identified patent and that said Letters Patent is hereby corrected as shown below:

Column 12, lines 40-45, Claim 12

Replace "a plurality of price display areas in said GUI, each of the plurality of price display areas being associated with a different text display area and operable to display a price for publishing the advertisement based on the publication format of the text in the associated text display area."

With --a plurality of price display areas in said GUI, each of the plurality of price display areas being associated with a different text display area and operable to display a price for publishing the advertisement based on the publication format of the text in the associated text display area; and
a total price display area in said GUI, said total price display area being operable to display a total price for publishing the advertisement based on selected publication formats.--

Column 13, lines 1-3, Claim 17

Replace "a pricing system that determines a price for publishing the classified advertisement in each of the first and second formats; and"

With --a pricing system that determines a price for publishing the classified advertisement in each of the first and second formats as well as a total price for publishing in both of the first and second formats; and--

Column 14, lines 4-6, Claim 22

Replace "determining by a pricing engine of a price for publishing the classified advertisement in each of the first and second formats; and"

With --determining by a pricing engine of a price for publishing the classified advertisement in each of the first and second formats as well as a total price for publishing in both of the first and second formats; and--

UNITED STATES PATENT AND TRADEMARK OFFICE
CERTIFICATE OF CORRECTION

PATENT NO. : 7,062,466 B2
APPLICATION NO. : 10/006765
DATED : June 13, 2006
INVENTOR(S) : Lisa M. Wagner et al.

It is certified that error appears in the above-identified patent and that said Letters Patent is hereby corrected as shown below:

Column 14, line 23,     Replace "26. The method of claim 17 wherein"
Claim 26

With --26. The method of claim 22 wherein--

Signed and Sealed this

Tenth Day of April, 2007

JON W. DUDAS
*Director of the United States Patent and Trademark Office*